W. B. FARLOW.
HOSE COUPLING.
APPLICATION FILED JAN. 13, 1916.
1,218,539.
Patented Mar. 6, 1917.
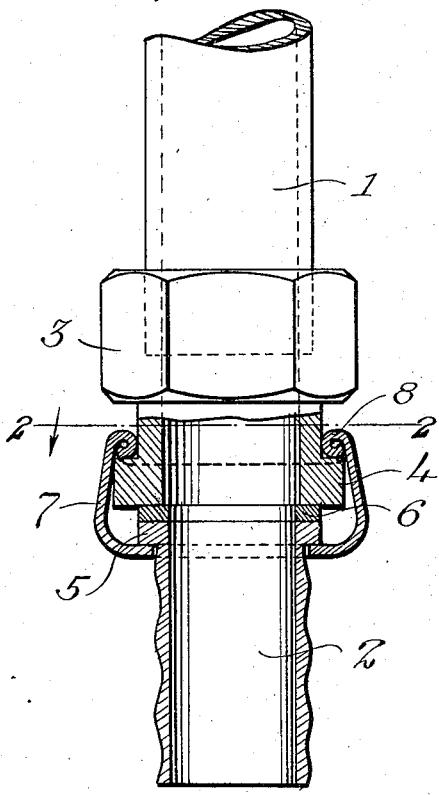
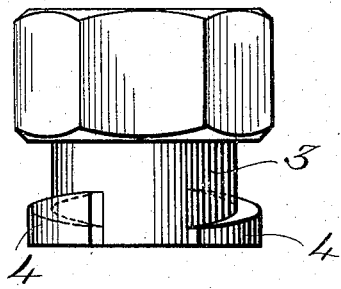
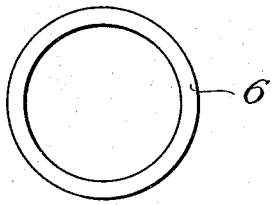
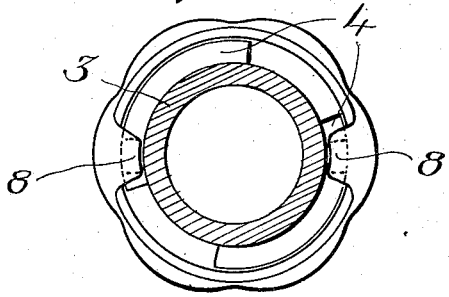
WITNESSES
INVENTOR
William B. Farlow
BY
ATTORNEY

UNITED STATES PATENT OFFICE.

WILLIAM B. FARLOW, OF BURLINGAME, CALIFORNIA.

HOSE-COUPLING.

1,218,539.
Specification of Letters Patent.
Patented Mar. 6, 1917.

Application filed January 13, 1916. Serial No. 71,934.

*To all whom it may concern:*

Be it known that I, WILLIAM B. FARLOW, a citizen of the United States, residing at Burlingame, in the county of San Mateo and State of California, have invented certain new and useful Improvements in Hose-Couplings, of which the following is a specification.

This invention relates to coupling devices and has particular reference to an improved form of hose or pipe coupling.

The principal object of the invention is to provide a coupling in which the time and labor necessary in connecting a hose or pipe to a faucet or to any length of hose or pipe is reduced to a minimum.

Another object of the invention is to provide a coupling which is simple in construction, cheap to manufacture, and which is thoroughly reliable and efficient in operation.

With the foregoing and other objects in view, the invention consists in the novel features of construction, combination and arrangement of parts as will be hereinafter more fully described, illustrated in the accompanying drawings, and claimed.

In the drawings:—

Figure 1 is a view partly in elevation and partly in section of my improved coupling.

Fig. 2 is a sectional view on the line 2—2 of Fig. 1.

Fig. 3 is a side elevation of the cam member; and

Fig. 4 is a plan view of the gasket.

Referring to the drawings by numerals wherein is illustrated the preferred embodiment of my invention, 1 designates a section of a pipe line to which is adapted to be coupled a second section of a line as shown at 2. The section 1, may be either the discharge spout of a bib, the terminal end of a section of pipe or hose, or may be the end of a section of line shaft, while the section 2 may be a connection for a rubber hose, a pipe, or may be one end of a second section of line shafting, it being understood that my invention is not limited in its use to a hose coupling but may be used for a variety of purposes.

Since the invention has been primarily conceived as a means for coupling a hose to a bib, the same will be described as used in this capacity. Adapted to be permanently threaded upon the discharge spout of the bib is a member 3 which is provided with a central bore communicating with the bore of the bib 1 and which has formed at diametrically opposite points upon its outer face at its lower edge, a pair of cam members 4 which extend approximately throughout one-fourth the circumference of the member 3. Each of the members 4 has the upper face thereof gradually tapering from the lower edge of the member 3 upwardly any desired distance upon the member 3. These upwardly extending faces of the cams 4 are oppositely arranged as shown in Fig. 3 of the drawings for a purpose which will presently appear.

The second section 2 of the pipe line is arranged in alinement with the member 3 and has a flange 5 formed upon the end thereof between which, and the lower end of the member 3, is arranged a gasket 6.

A cup shaped coupling member 7 is provided with a bore in one end of its wall of a size permitting the same to be slipped over the section 2 of the pipe line, the edges of the wall adjacent the bore being adapted to abut against the flange 5. This coupling member is open at the end opposite that in engagement with said flange and is provided at diametrically opposite points thereon with a pair of lugs 8 formed of extensions rolled inwardly upon themselves as is clearly illustrated in Fig. 2 of the drawings.

It is to be noted that the rolled extensions forming the pair of lugs permit the coupling to be tightened upon the cam members 4, since the lugs 8 formed by rolled metal may yield slightly or become compressed and in combination with the yieldable gasket 6 provide a secure joint. Should the coupling members be turned upon one another and exert such pressure upon the gasket as to cause a rupture of the same, the rolled portions or lugs 8 will yield sufficiently to relieve the strain upon the gasket.

By extending the cam members 4 but approximately one-fourth the circumference of the member 3, it will be noted that a space is provided between the adjacent ends of these cam members, as clearly illustrated in Fig. 2 of the drawings. In assembling the parts referred to, the lugs 8 of the coupling member 7 are passed through the space between the opposite ends of the cam members 4 and the coupling member is then rotated to bring the inwardly curved faces of the lugs into engagement with the angularly tapering faces of the cam members. Now, by further rotating the coupling member 7, the lugs will ride upon the inclined surfaces of the cams 4 and draw the end of the section 2 firmly against the outer end of the member 3, the member 7 being roughened or corrugated upon its exterior face as shown in Fig. 2 of the drawings in order to provide a convenient grip for the operator of the coupling in turning the same to draw the section 2 against the gasket 6.

From the foregoing description taken in connection with the accompanying drawings, it will be seen that I have provided a coupling which may be adapted to a variety of purposes, which requires but a minimum of time in order to provide a connection between two sections of a pipe line and one which is extremely simple in construction as well as being thoroughly reliable and efficient in operation and while I have herein shown and described one preferred embodiment of my invention, I do not wish to be limited thereto except for such limitations as the claim may import.

I claim:—

In a hose coupling, a pair of hose sections, one of which has a collar formed thereon, a gasket interposed between the meeting ends of the sections, a frusto-conical connection formed from a sheet of sheet metal and having its inner end bulged and engaged with the collar, rolled lugs formed upon the outer edge of the connection at diametrically opposite points, oppositely inclined cam lugs carried by the other section and defining spaces between their extremities to permit the rolled lugs to pass therein, where upon rotating the frusto-conical connection the hose sections will be locked together.

In testimony whereof I affix my signature in presence of two witnesses.

WILLIAM B. FARLOW.

Witnesses:
 SOPHIE JENSEN,
 ECHEL ROSS FARLOW.

Copies of this patent may be obtained for five cents each, by addressing the "Commissioner of Patents, Washington, D. C."